United States Patent [19]

Holland, deceased et al.

[11] 4,197,733

[45] Apr. 15, 1980

[54] PRESSURE TEST APPARATUS

[76] Inventors: Richard W. Holland, deceased, late of Houston, Tex.; by Donna M. Holland, administratrix, 617 Rancho Bauer, Houston, Tex. 77079

[21] Appl. No.: 24,727

[22] Filed: Mar. 28, 1979

[51] Int. Cl.² ............................................. G01M 3/28
[52] U.S. Cl. ..................................... 73/49.1; 73/49.5
[58] Field of Search ............... 73/40, 40.5 R, 46, 49.8, 73/49.1, 49.5; 138/90; 285/33

[56] References Cited

U.S. PATENT DOCUMENTS

| | | | |
|---|---|---|---|
| 2,699,802 | 1/1955 | Nilsson | 138/90 |
| 3,803,901 | 4/1974 | McConnell et al. | 73/49.8 |
| 4,127,026 | 11/1978 | Battafarano | 73/49.5 |

FOREIGN PATENT DOCUMENTS 160890  2/1964  U.S.S.R. .................................. 73/49.8

*Primary Examiner*—Gerald Goldberg
*Assistant Examiner*—Joseph W. Roskos
*Attorney, Agent, or Firm*—Donald Gunn

[57] ABSTRACT

Pressure test apparatus for testing heat exchanger tubing is disclosed, and the preferred embodiment includes pressure inlet and pressure outlet means for connecting to the open ends of heat exchanger tubing. The apparatus utilizes a quick disconnect mechanism for tubing which is pressure actuated by introducing water under pressure, the water flowing into the tube and maintaining continued pressure to thereby test the tubing for leakage. For fitting around the end of the tubing, the invention thus discloses a surrounding cylindrical body which is counterbored to an internal cavity which receives a set of collets which surround the end of the pipe. The collets collectively are abutted by a pressure transmission ring at the end, the ring being exposed to the water pressure. As the water pressure increases, the collets are driven into a wedged position, jamming against the pipe to be held in the test apparatus.

7 Claims, 4 Drawing Figures

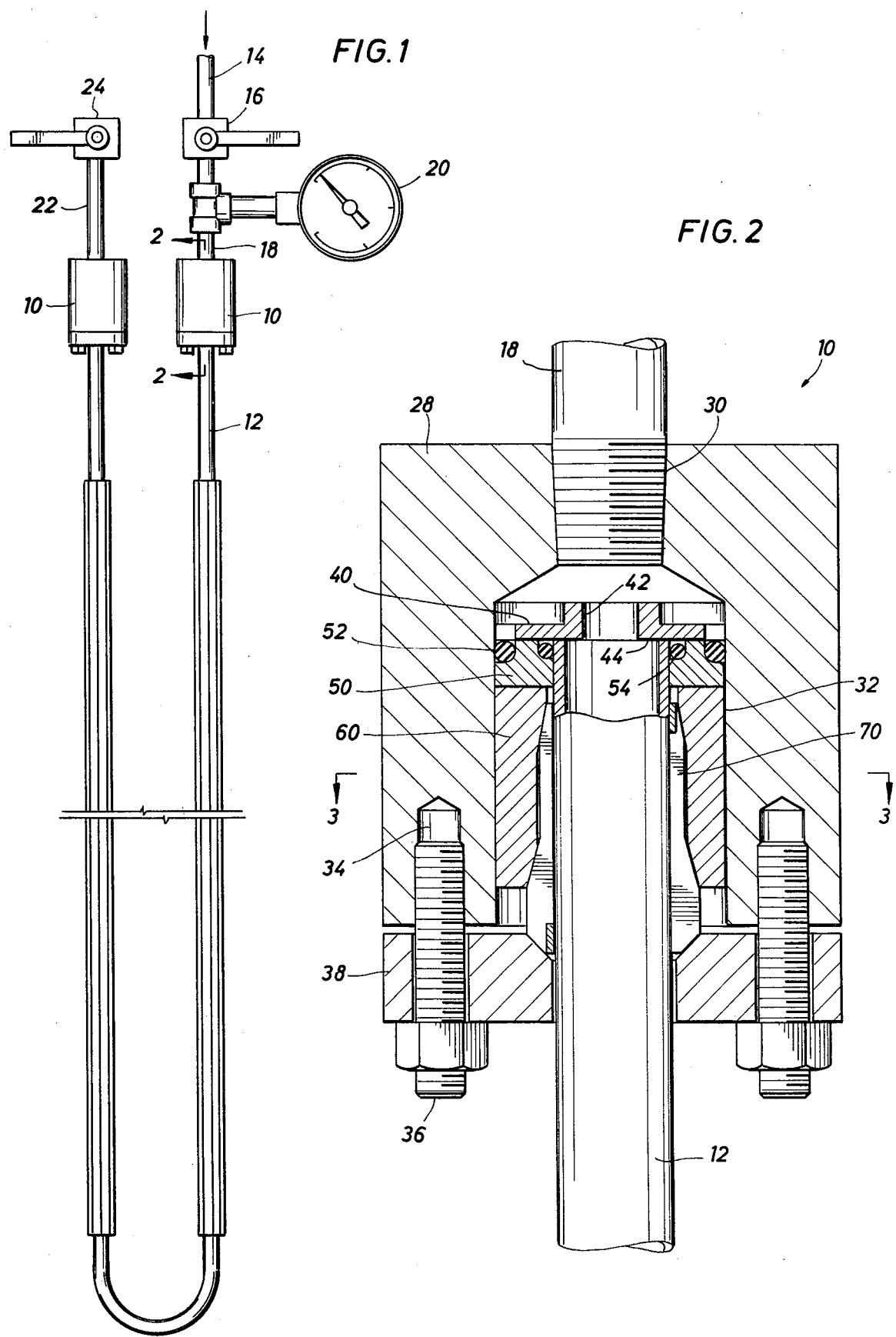

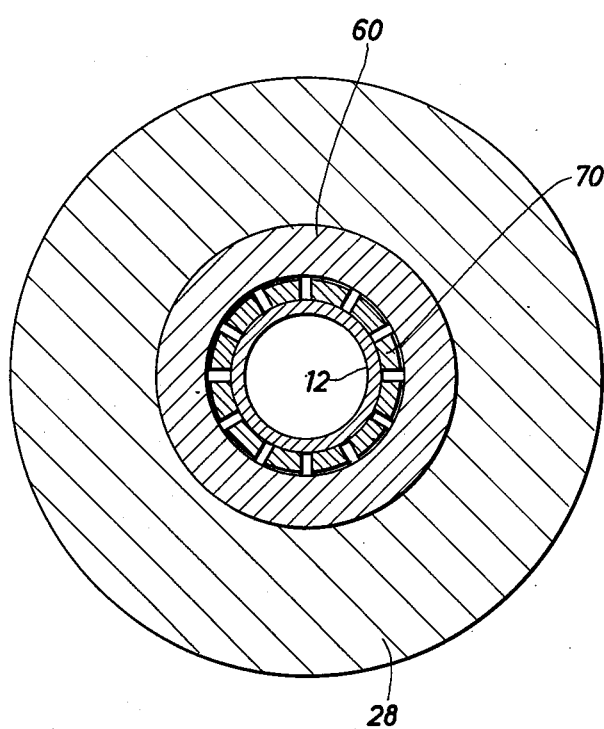
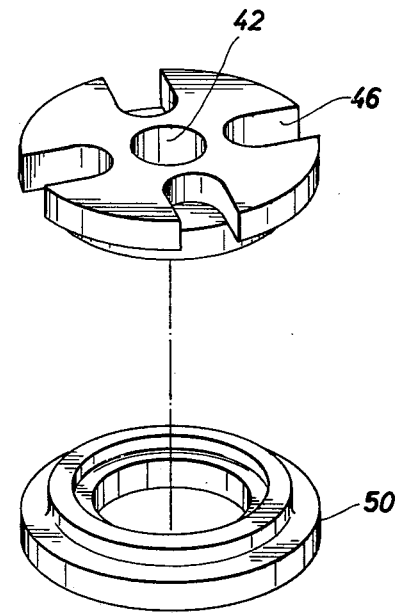
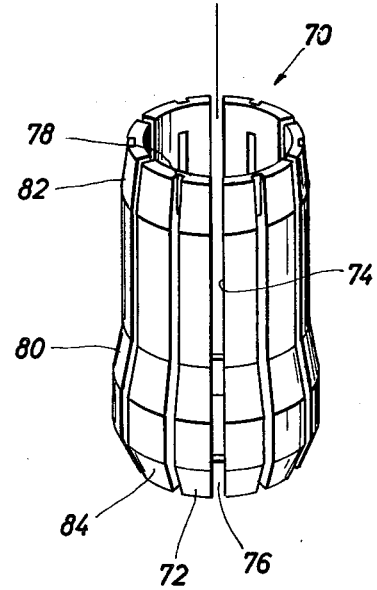
FIG. 4
FIG. 3

PRESSURE TEST APPARATUS

BACKGROUND OF THE DISCLOSURE

The present apparatus is test apparatus for use in testing heat exchanger pipes. A heat exchanger is formed of a multitude of U-shaped, long, thin pipes with cooling fins on the exterior. The cooling fins transfer heat from the liquid flowing in the U-shaped tubing to the exterior. The tubing, itself, therefore, must be leak-proof. This tubing is normally formed in a U-shape and has a set of fins affixed to its exterior. It is fabricated in shops which build hundreds of sets of such tubing, a quantity which may be found only in heat exchangers. The tubing is normally placed inside a chamber or cavity for exposure to a coolant, and the U-shaped heat exchanger tubes extend to the exterior where they typically connect with some kind of inlet header and an outlet header. The present invention reduces the time required to apply one hundred percent quality control testing to all the tubes. The present invention is able to quickly connect and disconnect to a given U-shaped tubing member. It enables the member to be tested by applying water under pressure to a test level. Assume, for instance, that the test level is 2,000 psi. Assume further that the test pressure must be held for five minutes. Assume further that the tubing must be visually inspected for leaks along the length of the tubing. With a test criteria of this sort, the present invention is able to quickly connect and subsequently disconnect to a given tubing. It is hydraulically actuated, using the pressure of the water, itself. This is a distinct advantage, and it is particularly advantageous because there is no need to thread the ends, dope threaded connections, carefully align threaded fittings or undertake other steps of this sort. Rather, the end of the tubing to be tested is simply stabbed into the fitting of the present invention and held there until water pressure is increased. As the pressure increases, the equipment is set in response to the change in pressure. The test is then completed by making the necessary observations at the desired static pressure level.

With the background of the situation described above, the present invention thus defines a quick disconnect fitting which is adapted to pressure test heat exchanger tubing, the test apparatus comprising a quick disconnect fitting for high pressure testing. It includes an outer body which is counterbored. The outer body contains a set of collets which are acted on by thrust rings which respond to water under pressure introduced at the end of the test fitting. Water under pressure forces a ring against the collet fingers, and the collet fingers jam, thereby wedging against the surrounding support for them and locking the pipe. The locking force which holds the pipe in the test fixture exceeds the axial thrust created by the water which would otherwise expel the pipe.

BRIEF DESCRIPTION OF THE DRAWINGS

FIG. 1 shows the present invention installed on a U-shaped heat exchanger pipe for testing;

FIG. 2 is an enlarged, detailed, sectional view along the line 2—2 of FIG. 1 showing internal details of construction of the test connection apparatus of the present invention;

FIG. 3 is a detailed, sectional view along the line 3—3 of FIG. 2 showing the pipe inserted into an expandable collet mechanism; and FIG. 4 is an exploded view of end rings and collet members showing their position in a disassembled state.

DETAILED DESCRIPTION OF THE ILLUSTRATED EMBODIMENT

Attention is first directed to FIG. 1 of the drawings where a test apparatus is shown which includes the connector means of the present invention. The test procedure and apparatus will be described first, and, thereafter, the present invention will be described in greater detail. In FIG. 1 of the drawings, the numeral 12 identifies a U-shaped tubing to be tested. It is connected at two ends to the present invention, which is identified by the numeral 10. The fittings or connectors are shown at 10, affixed to each end of the U-shaped tubing. On one side of the U-shaped tubing, water is introduced through a conduit 14 and a valve 16. The valve 16 has a handle which can be opened or closed. The valve 16 delivers water under pressure through a pipe 18. The pipe 18 is connected by means of a tee through a lateral to pressure gauge apparatus at 20. The pressure gauge 20 is useful in determining the level at which the test is operated, and it also indicates line pressure. The water under pressure is introduced through one side or the other of the U-shaped tubing 12.

The second connector means 10 of the present invention is connected to a simple outlet pipe 22 which, in turn, connects with a valve 24. The valve 24 opens to void the pipe. When the test is first initiated, it is often necessary to bleed air from the pipe 12, and, to this end, the valve 24 is cracked open slightly. This will void water and carry with it air bubbles captured in the U-shaped tubing. Needless to say, the U-shaped tubing can be manipulated so that bubbles rise to the top and are voided through the valve 24. When a sufficient amount of water flows through the valve 24, the valve 24 is then closed, and the test is thereafter run with only water in the pipe 12. The U-shaped fitting 12 is then ready to be tested, applying any suitable test procedure dependent on the safe, leak-proof connection of the present invention to the end of the U-shaped tubing.

Attention is next directed to the present invention which is shown in greater detail in FIG. 2. There, the pipe 12 is received in the apparatus from the lower end, while the pipe 18 introduces water to the connector. The connective mechanism 10 shown in FIG. 2 includes a large, solid, cylindrical body 28 which is centrally drilled and threaded at 30 to receive the water line 18. It is counterbored to a larger diameter at 32. The counterbore 32 is surrounded by several tapped openings 34 which receive head bolts 36. The several head bolts, in conjunction with nuts placed on them, secure a plate 38 which is clamped by the head bolts. The plate 38 serves as a head plate to close and assemble all of the equipment to be described with regard to FIG. 2.

The opening 32 is a large, cylindrical, counterbored volume. It encloses a thrust ring 40 which is received in the counterbored opening 32. The thrust ring 40 is axially drilled at 42. This enables water to flow from the pipe 18 into the tubing 12 to be tested. The thrust ring has a transverse face 44 for abutting the end of the pipe. The pipe 12 is ideally cut transversely. In the event that there is some departure from this, no particular harm arises as long as the irregularity in the end cut is held to variations less than a specified amount. The thrust ring jams against the pipe and drives it outwardly in response to hydraulic pressure. The thrust ring drives the pipe 12 in FIG. 2 downwardly. It moves in response to water pressure delivered to the test apparatus 10 through the pipe 18. The water acts across the cross-sectional area of the thrust ring 40.

The thrust ring is better shown in FIG. 4 of the drawings. There, the thrust ring is shown with certain radial slots or grooves at 46. The slots or grooves 46 enable water under pressure to surround the thrust ring. The function of this will be more clearly understood hereinafter.

The thrust ring 40 jams against the pipe 12 at the end of the pipe. In addition, a piston ring 50 fits on the exterior of the pipe. The piston ring incorporates a sufficient width or diameter to completely fill the passage 32. In other words, no water leaks past the piston ring. To assure that this is the situation, a first seal ring 52 is positioned on a step in the piston ring. A second seal ring 54 is positioned on a smaller step. The two seal rings prevent leakage past the piston ring. Thus, pressure on the wet side of the piston ring is equal to line pressure, while pressure on the opposite side is substantially equal to atmospheric pressure. The piston ring 50 bears against certain components to be described, but, in the main, there is no seal system on the low pressure side of it, and, therefore, no back pressure occurs on that side.

A thimble 60 is inserted into the counterbored cavity 32. It fits in the counterbored, cylindrical cavity 32, and it also abuts at one end against the piston ring 50. It is driven outwardly as the piston ring 50 is pressurized. The thimble 60 is a solid body having an internal surface or profile to work against a set of collets. It will be observed that it fits rather loosely. It fits loosely against the smaller collet within, and it also fits somewhat loosely in the counterbored cavity 32. The thimble 60 thus is free to slide, and it is able to grip the collet to be described. It has an internal profile, as shown by the sectional view of FIG. 2, which enables it to squeeze against the collet member which will grip or hold the pipe 12 when installed and pressurized.

Attention is next directed to the collet member 70. The collet member 70 is centrally drilled to fit around the pipe 12. It fits rather snugly, but the fit is not a friction fit. It can be moved by hand along the pipe 12. The collet assembly is formed of a single piece of stock which is axially drilled, as mentioned above, and it has a number of fingers along the exterior. One such finger is identified at 72 in FIG. 4. It will be observed that the collet is slotted with a lengthwise slot 74 adjacent to the finger 72. The slot, in conjunction with other similar slots, serves to define the finger. The finger 72 is completely free of the adjacent fingers, except that a transversely extending connective bridge or web 76 is left at the lower end of the collet 70. In like fashion, a connective bridge 78 is left at the upper end in the next adjacent slot. As a consequence, all of the fingers remain nested together and function together as a unit, not as separate entities. The slots which define the fingers are substantially cut all the way through except that each slot terminates at a connective bridge, such as the bridges 76 and 78 shown in the drawings. The metal that defines the webbing at the end of each slot holds the apparatus together. The bridges are at opposite ends of alternate slots. Thus, every other slot has a bridge at its lower end, and the other slots have a bridge at the upper end. This alternate placement permits the collet to shrink.

The collet assembly 70 is able to be squeezed and is, therefore, able to shrink on radial force applied to it. Radially directed forces applied to the collet assembly result in the yielding of the assembly as a result of its construction.

Referring to FIG. 4 of the drawings, the collet assembly 70 incorporates a generally tapered face at 80 and a second tapered face at 82. These faces drive the collet assembly into the matching thimble 60. They are separated by a tubular portion which is of right cylindrical construction. In addition, there is an end face 84 which is tapered.

The head plate 38 is drilled with a camfer surface centrally located in it to receive the tapered face 84 shown in FIG. 2. This enables the thrust of the collet assembly to be resisted by an equal and opposite thrust. Thus, the collet assembly jams and is thereby shrunk when it is axially thrust against the camfer drilled opening in the head plate 38. This is important to the operation of the device.

Operation of the present invention can be understood by tracing through its use. With water pressure substantially at zero, the pipe 12 is stabbed into the assembly 10 and pushed until it abuts the thrust ring 40. The thrust ring 40 is limited in travel. When the pipe 12 jams against the thrust ring 40, it is also received in the piston ring 50. In other words, the piston ring 50 is positioned about the end of the pipe. Water under pressure is introduced. Some of the water, of course, will flow into the pipe 12. As pressure in the pipe 12 rises, pressure at the thrust ring 40 also increases. This pressure increase is also sensed at the piston ring 50. The piston ring 50 is driven downwardly in FIG. 2 of the drawings. As it moves downwardly, it drives the thimble 60 downwardly. The thimble initiates a wedging action which increases with axial movement. This wedging action impinges on the collet assembly. It will be recalled that the collet assembly fits slightly loosely around the pipe 12. As the wedging action occurs, the collet assembly 70 grips the pipe 12. This is accompanied by shrinkage of the collet assembly as a result of the loading which is placed on the collet assembly. This loading thus assures that the apparatus will grip the pipe 12. The grip which then occurs is a result of the gripping action of the collet assembly. It shrinks and thereby achieves a strong grip on the pipe 12. This grip is held indefinitely. The grip is sustained for a substantial period of time, the grip being a result of pressure in the fitting 10.

As long as the pressure is maintained, the grip is maintained. In the event the pressure drops towards zero, the grip will be released, but this is desirable so that the apparatus 10 can be disengaged from the test specimen. As can be understood, the pressure responsive grip of the test apparatus 10 thus serves for the required interval and thereafter is released to make easy disengagement possible.

The present invention is installed on both legs of the U-shaped heat exchanger tube. They both function in the same fashion. The difference which results from the location of the apparatus does not imply a difference in the mode of operation. In other words, two connector means are shown in FIG. 1, and they function in the same manner, notwithstanding the fact that water flows into the righthand connector apparatus 10 from the pressure line, while it flows into the lefthand test apparatus from the test specimen.

While the foregoing is directed to the preferred embodiment, the scope of the present invention is determined by the claims which follow.

That which is claimed:

1. A connector apparatus for connecting to the unthreaded end of a heat exchanger tubing to enable testing of the tubing with a liquid test medium, the apparatus comprising:
    (a) an outer body having a cylindrical counterbore therein and an externally accessible opening for admission of a liquid test medium;
    (b) a thrust ring having an internal abutting shoulder which limits the entry of the heat exchanger tubing to be tested on insertion of the tubing into said cylindrical counterbore;
    (c) a piston ring adapted to fit about the tubing to be tested and slidably positioned within said cylindrical counterbore, said piston ring having seal means thereon to prevent leakage therepast and which piston ring moves in response to pressure within said cylindrical counterbore;
    (d) collet means fitting about the tubing to be tested;
    (e) tapered thimble means slidably positioned adjacent to said piston ring within said cylindrical counterbore and adapted to be moved by said piston ring against said collet means for imparting a gripping movement to said collet means such that said collet means grips the tubing while said thimble means has moved against said collet means; and
    (f) end closure means defining the position of said collet means within said cylindrical counterbore and which closure means is axially formed with a central passage to permit the tubing to be tested to be inserted therethrough to be gripped by said collet means and further to abut said thrust ring.

2. The apparatus of claim 1 wherein said piston ring includes first and second shoulders thereon, and each of said shoulders receives a flexible seal ring thereon, and one of said seal rings is adapted to contact said cylindrical counterbore, and the other of said seal rings is adapted to contact the tubing inserted therethrough.

3. The apparatus of claim 1 wherein said collet means is constructed and arranged of a set of lengthwise slots defining adjacent, parallel fingers wherein said slots are substantially, but not completely, cut parallel to adjacent fingers to define a connective webbing between adjacent fingers with alternate webbings at opposite ends of said collet means so that said collet means is a single unit which includes connections between adjacent fingers thereof and the fingers are arranged fully circumferentially around the tubing to be tested.

4. The apparatus of claim 3 wherein said collet means includes first and second external tapered surfaces adapted to be contacted by similar, matching, angled surfaces on said thimble means which has an angle such that the collet fingers are jammed toward one another to thereby shrink said collet means.

5. The apparatus of claim 4 wherein said collet fingers include an end located, tapered face adapted to contact against said end closure means.

6. The apparatus of claim 5 wherein said piston ring includes first and second shoulders thereon, and each of said shoulders receives a flexible seal ring thereon, and one of said seal rings is adapted to contact said cylindrical counterbore, and the other of said seal rings is adapted to contact the tubing inserted therethrough.

7. The apparatus of claim 6 wherein said end closure means is separate from said outer body and is attached thereto to cover said counterbore leaving an exposed axially aligned opening in said end closure means.

* * * * *